Patented Sept. 3, 1946

2,406,864

UNITED STATES PATENT OFFICE 2,406,864

MANUFACTURE OF HYDROCARBONS

Charles L. Thomas, Chicago, Ill., assignor to Universal Oil Products Company, Chicago, Ill., a corporation of Delaware No Drawing. Application May 31, 1939, Serial No. 276,553

14 Claims. (Cl. 260—449.6)

This invention concerns a process for synthesizing organic compounds such as hydrocarbons, alcohols, aldehydes, etc., by the reaction of carbon monoxide and hydrogen in the presence of a specially prepared catalytic mass.

More specifically, the invention relates to improvements in the synthesis of hydrocarbons of gasoline and higher boiling range from carbon monoxide and hydrogen, said hydrocarbons having greater value as motor fuel than those produced according to present methods.

A process has been practiced for converting mixtures of carbon monoxide and hydrogen such as may be present in products of water gas reaction, into gaseous and liquid hydrocarbons as well as other organic compounds. The products of this reaction consist largely of aliphatic hydrocarbons mostly paraffinic in nature, although approximately 20-30% of olefinic hydrocarbons may also be present. In addition to the gasoline, higher boiling oil and high melting waxes are formed. By suitably adjusting operating conditions other organic compounds including alcohols, aldehydes, etc., can be produced.

The catalysts used are normally selected from the metals of the VIII group of the periodic system promoted with thoria. These catalysts, usually consisting of a composite of iron, cobalt and/or nickel and thoria, are prepared by precipitating the oxides of the metals on kieselguhr, followed by reducing with hydrogen. Other metals or their oxides, such as manganese, aluminum, copper, etc., may be added in relatively minor amounts.

Because of the straight-chain character of the hydrocarbons produced, the motor fuel fraction usually has poor antiknock properties, and must be treated in some manner, such as by cracking or reforming to improve the octane characteristics. The present invention offers an improvement whereby motor fuels of improved octane qualities may be produced directly from the process by adding to the above described catalytic mass, a second catalytic mass known to function as an isomerizing and cracking catalyst.

In one specific embodiment, the present invention comprises converting mixtures of carbon monoxide and hydrogen into organic compounds such as gaseous and liquid hydrocarbons containing substantial quantities of valuable motor fuel products, by contacting such mixtures with a catalytic mass comprising a metal of group VIII of the periodic system, thoria, precipitated silica and a compound selected from the group consisting of alumina and zirconia.

According to one variation of the present invention, the catalytic mass normally used in carrying out the synthesis, and which consists of reduced metals and/or oxides including iron, cobalt, nickel, copper, manganese, or aluminum deposited on kieselguhr and promoted with thoria and known hereinafter as the hydrogenating component, may be mixed mechanically with a second catalytic mass known to function as an isomerizing and cracking catalyst.

Although the isomerizing and cracking catalyst may include naturally occurring earths which have been treated with acids or other chemicals to increase their activity, it is preferred to use a special catalytic mass consisting of silica-alumina, silica-alumina-zirconia, silica-zirconia, silica-alumina-thoria, etc. Such a mass may be prepared by precipitating silica and the component oxide or hydrogels either simultaneously or in separate steps followed by mixing and washing in such a manner that alkali metal compounds are substantially removed.

The component parts of the catalytic mass of the present invention may then be combined and formed into pellets or other shapes. Usually the catalyst is prepared in the following manner:

The hydrogenating component is prepared by precipitating the hydroxides of the metals on kieselguhr or similar suitable siliceous material. This is usually carried out by suspending the kieselguhr in an aqueous solution containing the metal salts such as mixtures of cobalt chloride, ferric chloride and a minor amount of thorium nitrate. This is usually made into a thick paste which is then added to a solution of an alkali metal hydroxide or carbonate in order to precipitate the metals on the kieselguhr in the form of the corresponding hydroxides or basic carbonates. The mixture is washed with water, filtered, and dried. The isomerization-cracking component is prepared in powdered form in a separate operation. The powders of the component masses are intimately mixed and formed into shapes such as pellets, spheres, etc., and then calcined at a temperature above 400° C. The composite thus formed is reduced with hydrogen at a temperature above 200° C. to produce the final catalytic mass of the present invention.

According to another variation, the special silica-alumina, silica-zirconia, or silica-alumina-zirconia mass which comprises the isomerizing and cracking component of the finished catalyst is prepared in one step as previously indicated, and the oxides of the materials comprising the hydrogenating element of the catalyst are precipitated thereon. In this case ammonium hydroxide is preferred as the precipitant. The mixture is filtered, washed, and dried, formed into shapes and finally calcined. The mixture is then reduced with hydrogen prior to use in the process.

When employing earths of the chemically activated clay type as the cracking constituent, the two components of the catalyst may be prepared in a manner similar to those employed with the precipitated silica-alumina, silica-zirconia, etc. mass.

As a further alternative, the components of my catalyst may be prepared as previously described in separate operations and made into particles such as pellets. These pellets are then separately calcined, mixed together, and subjected to the action of hydrogen under reducing conditions prior to use in the process.

Another alternative consists in the use of alternating layers of the individual catalytic components, said layers being disposed within the same reaction tube or chamber. For example, the cracking component may constitute one layer, above this may be disposed a layer of the hydrogenation element, followed by another layer of cracking element, and so on until the chamber is filled. Usually the metallic constituents of the catalyst are formed in situ by first loading the reactors and then reducing the oxides to the corresponding metals. The above types of operations are not necessarily exactly equivalent. One may be more desirable than another under a given set of circumstances.

In carrying out the process for hydrocarbon manufacture, the temperature employed is within the range of approximately 175°–300° C. The ratio of carbon monoxide to hydrogen is usually approximately 1:2, although this is not to be considered by any means an exact proportion. Water gas prepared from coal, consisting of approximately two parts carbon monoxide, four parts hydrogen, and one part carbon dioxide, has been found satisfactory. The composition of the hydrocarbon mixture resulting from this process can be varied somewhat by varying the ratio of the reactant gases, for example, olefin production is increased if the amount of hydrogen is decreased.

It is essential to the life of the catalyst and the properties of the resulting hydrocarbons that the sulfur content of the reactant gases be kept at a minimum. The sulfur may be removed from the gases by known methods, among which is treatment with oxides of metals such as iron, or treatment with amines such as triethanol amine, diethanol amine, and tripropanol amine; solutions of tripotassium phosphate have also been used for this purpose. The catalyst becomes exhausted periodically, and may be reactivated by extracting with solvents to remove waxy materials deposited thereon. It may require additional reactivation at intervals, and this is done by heating in the presence of air to remove carbonaceous deposits. The catalyst is again reduced with hydrogen before use.

The process may be operated at substantially atmospheric pressure, although higher pressures offer certain definite advantages such as that of improved heat transfer. Although the increased pressure changes the ratio of the products formed to a certain extent, pressures in the range of 5–25 atmospheres are especially useful.

If the hydrogen content is increased to too great an extent, increased methane formation results, although the degree of saturation of the hydrocarbons produced is increased. Methane formation may be reduced in cases of high hydrogen concentration by reducing the temperature of the reaction.

The following examples are given to illustrate the usefulness of my process, but should not be construed as limited to the exact conditions or materials used thereon.

Example 1

Water gas produced by reacting steam with coke, and consisting of approximately two parts carbon monoxide, four parts hydrogen, and one part carbon dioxide, was passed over a catalyst prepared in the following manner:

Silica hydrogel was precipitated from a sodium silicate solution by addition thereto of hydrochloric acid until the reaction mixture was just acid to litmus paper. To this mixture was added 10 mol per cent of aluminum chloride. Ammonium hydroxide was added in sufficient quantity to precipiate the oxide. The mixture was filtered, dried at 300° F., crushed to pass a 30 mesh screen, and washed with water to which had been added small amounts of hydrochloric acid, until the mass was substantially free of alkali metal compounds. This mass was the isomerizating and cracking component of the final catalyst.

The hydrogenating component of the catalytic mass was prepared in the following manner:

Kieselguhr was suspended in an aqueous solution of cobalt chloride, ferric chloride, and a minor amount of thorium nitrate, so that a thick paste was formed. The corresponding hydroxides were precipitated by adding this paste with stirring to a solution of potassium hydroxide. The product was then washed until essentially free of chloride ions, and dried. The isomerizing-cracking component was mixed with this mass and the mixture was compressed into pellets which were subjected to the action of hydrogen at a temperature of 250° C.

The water gas was contacted with the catalyst at 190° C. and substantially atmospheric pressure. The liquid hydrocarbons were recovered and a portion of the unreacted hydrogen and carbon monoxide was returned to contact with the catalytic mass. The hydrocarbons boiling within the motor fuel range were separated. The yield amounted to 145 g. per cubic meter of reactant gases. This compared with 130 g. produced by the regular catalyst. The octane number of the motor fuel fraction produced according to the present process was 65, while that produced in the usual manner was 20.

Example 2

The catalyst used in this example was prepared in a similar manner to that described above, except that the isomerizing and cracking component contained added thereto four mol per cent of precipitated zirconia. The powdered catalysts were mixed together to form the catalytic composite of the invention, dried and formed into pellets, and used in the process substantially as described in Example 1. In this case, 142 g. of hydrocarbons were formed per cubic meter of reactant gas. The octane number of the gasoline fraction was 62.

In the above examples, the yield of liquid hydrocarbons was increased when using the present catalyst over that obtained by the usual catalytic masses. Moreover, the amount of hydrocarbon boiling in the gasoline range was increased by approximately 15%. The most useful result is the greatly superior antiknock quality of the gasoline produced by this process.

I claim as my invention:

1. In the synthesis of hydrocarbons by reaction of carbon monoxide and hydrogen in the presence of a hydrogenating catalyst consisting essentially of thoria and at least one of the metals of group VIII of the periodic system, the method of increasing the anti-knock value of the hydrocarbons produced by the synthesis which comprises associating with said catalyst an isomerizing and cracking catalyst consisting essentially of a major proportion of silica and a minor proportion of at least one of the oxides of the group consisting of alumina and zirconia.

2. In the synthesis of hydrocarbons by reaction of carbon monoxide and hydrogen in the presence of a hydrogenating catalyst consisting essentially of thoria and at least one of the metals of group VIII of the periodic system, the method of increasing the anti-knock value of the hydrocarbons produced by the synthesis which comprises associating with said catalyst an isomerizing and cracking catalyst consisting essentially of a major proportion of silica and a minor proportion of alumina.

3. In the synthesis of hydrocarbons by reaction of carbon monoxide and hydrogen in the presence of a hydrogenating catalyst consisting essentially of thoria and at least one of the metals of group VIII of the periodic system, the method of increasing the anti-knock value of the hydrocarbons produced by the synthesis which comprises associating with said catalyst an isomerizing and cracking catalyst consisting essentially of a major proportion of silica and a minor proportion of zirconia.

4. In the synthesis of hydrocarbons by reaction of carbon monoxide and hydrogen in the presence of a hydrogenating catalyst consisting essentially of thoria and at least one of the metals of group VIII of the periodic system, the method of increasing the anti-knock value of the hydrocarbons produced by the synthesis which comprises associating with said catalyst an isomerizing and cracking catalyst consisting essentially of a major proportion of silica and minor proportions of alumina and zirconia.

5. As a composition of matter, a hydrogenating catalyst consisting essentially of thoria and at least one of the metals of group VIII of the periodic system, in combination with an isomerizing and cracking catalyst consisting essentially of a major proportion of silica and a minor proportion of at least one of the oxides of the group consisting of alumina and zirconia.

6. As a composition of matter, a hydrogenating catalyst consisting essentially of thoria and at least one of the metals of group VIII of the periodic system, in combination with an isomerizing and cracking catalyst consisting essentially of a major proportion of silica and a minor proportion of alumina.

7. As a composition of matter, a hydrogenating catalyst consisting essentially of thoria and at least one of the metals of group VIII of the periodic system, in combination with an isomerizing and cracking catalyst consisting essentially of a major proportion of silica and a minor proportion of zirconia.

8. As a composition of matter, a hydrogenating catalyst consisting essentially of thoria and at least one of the metals of group VIII of the periodic system, in combination with an isomerizing and cracking catalyst consisting essentially of a major proportion of silica and minor proportions of alumina and zirconia.

9. The method as defined in claim 1 further characterized in that said isomerizing and cracking catalyst is a calcined mixture of the hydrogels of silica and alumina.

10. The method as defined in claim 1 further characterized in that said isomerizing and cracking catalyst is a calcined mixture of the hydrogels of silica and zirconia.

11. The method as defined in claim 1 further characterized in that said isomerizing and cracking catalyst is a calcined mixture of the hydrogels of silica, alumina and zirconia.

12. The method as defined in claim 5 further characterized in that said isomerizing and cracking catalyst is a calcined mixture of the hydrogels of silica and alumina.

13. The method as defined in claim 5 further characterized in that said isomerizing and cracking catalyst is a calcined mixture of the hydrogels of silica and zirconia.

14. The method as defined in claim 5 further characterized in that said isomerizing and cracking catalyst is a calcined mixture of the hydrogels of silica, alumina and zirconia.

CHARLES L. THOMAS.